United States Patent
Hu et al.

(10) Patent No.: US 11,059,429 B1
(45) Date of Patent: Jul. 13, 2021

(54) CAR MULTIMEDIA DEVICE WITH FUNCTION FOR AUTOMATICALLY SWITCHING BETWEEN INTERNAL DEVICE CONTROL MODE AND EXTERNAL DEVICE CONTROL MODE AND CAR MULTIMEDIA DEVICE CONTROL METHOD

(71) Applicant: Carnetek Technology Co., Ltd., New Taipei (TW)

(72) Inventors: Chih San Hu, New Taipei (TW); Che Hung Yang, New Taipei (TW)

(73) Assignee: Carnetek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/747,671

(22) Filed: Jan. 21, 2020

(30) Foreign Application Priority Data

Dec. 20, 2019 (TW) ................................ 108146900

(51) Int. Cl.
*H04W 48/04* (2009.01)
*B60R 11/02* (2006.01)
*H04N 21/414* (2011.01)

(52) U.S. Cl.
CPC ...... *B60R 11/0264* (2013.01); *B60R 11/0252* (2013.01); *H04N 21/41422* (2013.01); *B60R 2011/0294* (2013.01)

(58) Field of Classification Search
CPC ......... H04W 4/00; H04W 4/04; H04W 48/04; H04W 4/80; H04W 88/02; H04W 88/04; H04W 88/08
See application file for complete search history.

(56) References Cited

U.S. PATENT DOCUMENTS

| | | | | |
|---|---|---|---|---|
| 2012/0172087 A1* | 7/2012 | Varela | ................. | B60K 37/06 455/556.1 |
| 2014/0368475 A1* | 12/2014 | Spahl | .................... | G06F 3/0362 345/184 |
| 2015/0334441 A1* | 11/2015 | Sukegawa | ............... | G06F 21/44 725/25 |
| 2020/0221156 A1* | 7/2020 | Caltabiano | ......... | H04N 21/4627 |

\* cited by examiner

*Primary Examiner* — Blane J Jackson
(74) *Attorney, Agent, or Firm* — Karin L. Williams; Alan D. Kamrath; Mayer & Williams PC

(57) ABSTRACT

The invention provides a car multimedia device for automatically switching between an internal device control mode and an external device control mode, comprising a first connection port, a second connection port and a control module for being connected to the first connection port and the second connection port. The control module scans the second connection port to determine whether the second connection port is connected to an external electronic device. When the second connection port fails to be connected to the external electronic device, the control module performs the internal device control mode to control the car display via a car host. When the second connection port is connected to the external electronic device, the control module transmits a master control information of the external electronic device to the car display such that the external electronic device controls the car display via the control module for rapidly automatically switching.

18 Claims, 11 Drawing Sheets

CAR MULTIMEDIA DEVICE WITH FUNCTION FOR AUTOMATICALLY SWITCHING BETWEEN INTERNAL DEVICE CONTROL MODE AND EXTERNAL DEVICE CONTROL MODE AND CAR MULTIMEDIA DEVICE CONTROL METHOD

BACKGROUND OF THE INVENTION

1. Field of the Invention

The invention relates to a car multimedia device and a control method, and particularly to a car multimedia device with a function for automatically switching between an internal device control mode and an external device control mode and a car multimedia device control method.

2. Description of the Related Art

A car computer having functions of entertainment and navigation has been more and more popular for the past few years. The car computer includes a car host and a car display. The car host is connected to the car display and plays multimedia data by the car display to satisfy requirements of various audiovisual entertainments, and plays navigation path by the car display for drivers and passengers. To meet specific standards and safety requirements for the car host, the car host operates a specific operating system and specific applications. The specific operating system and the specific applications lead to different operating experiences from a personal computer or a mobile device for the user.

Today, the smartphone has been completely indispensable in people's life. For the user to conveniently use the car host and the car display, manufacturers of the car computers develop various solutions by projecting applications of the smart phone to the car display for the user to extend the operation habits of the user and the applications of the smartphone to the car host and the display.

Please refer to FIG. 7. In a first solution, a switching master control device 83 is connected between the car display 82 and the car host 81. The switching master control device 83 has an interface software and applications. The interface software includes a communication protocol of the car host 81 and the car display 82. Therefore, the switching master control device 83 can receive original control information of the car host 81, combines the applications and the original control information, and further controls the car display 82 according to the communication protocol. Namely, the first solution can combine the function of the original car host 81 and the applications of the switching master control device 83. However, the switching master control device 83 has at least the following defects. Since the switching master control device 83 needs to communicate with the car host, different car hosts of different manufacturers have to develop different switching master control devices 83. When the switching master control devices 83 is installed in a car body, the car body is need to be disassembled. Therefore, a cost for developing and installing the switching master control device 83 is high, and the applications of the switching master control device 83 may not be easily updated.

Please refer to FIG. 8. In a second solution, an interface software can project the application of the smartphone 91 connected to the car host to the car display 82. The interface software provides an interface communication protocol between the smartphone 91 and the car host 81, and projects the applications authenticated by the interface communication protocol to the car display 82 via the car host 81. Then, the user can manipulate the applications via the car display 82. The interface software may be the Android Auto of the Android system and the Carplay of the iOS system. These applications are music play programs, map navigation programs, phone dial up programs, voice assistance programs, and so on.

From the user's aspect, when the smartphone 91 firstly installs the interface software and secondly is connected to an input port of the car computer, the smartphone 91 can communicate with the car host 81 via the interface communication protocol of the interface software, and the smartphone 91 can be set as a master device of the car display 82. Then, the user can use the applications via the car display 82.

Furthermore, in a third solution, the manufacturers develop an external car multimedia device with a smartphone operating system based on the theorem of the interface software mentioned above. The external car multimedia device has the interface software and the applications authenticated by the interface communication protocol of the interface software, and the external car multimedia device is disposed in the car and is connected to the input port of the car computer, such that the external car multimedia device can communicate with the car host via the interface software, and the external car multimedia device can be set as the master device of the car display. Therefore, the users may not need to connect the smartphone to the input port of the car computer when they drive the car, and the users can utilize the applications same as the smartphone operating system on the car display.

However, please refer to FIG. 9A and FIG. 9B. When the car has installed the external car multimedia device 92 with the smartphone operating system which is connected with the car computer, the user cannot directly connect the smartphone 91 to the car computer. When the user wants to use the application of the smartphone on the car display 82, the user needs to replace the smartphone 91 with the external car multimedia device 92 such that the smartphone 91 can be the master device of the car display 82. Since the operating system of the external car multimedia device 92 is same as the operation system of the smart phone 91, the external car multimedia device 92 cannot be compatible with the smartphone 91. Therefore, the user needs to remove the external car multimedia device 92 from the input port of the car computer and to connect the smartphone 91 to the input port of the car computer. In this way, the user can use the application of the smartphone 91 on the car display 82 instead of using the application of the external car multimedia device 92. On the contrary, if the user wants to use the application of the external car multimedia device 92, the user needs to remove the smartphone 91 and to connect the external car multimedia device 92 to the car computer. Therefore, it is inconvenient for the user.

SUMMARY OF THE INVENTION

The invention provides a car multimedia device with a function for automatically switching between an internal device control mode and an external device control mode for connecting to a car host and controlling a car display via the car host. The car multimedia device includes a first connection port, a second connection port, and a control module. The control module electrically connects to the first connection port and the second connection port, and the first connection port is used to be connected to the car host. The control module scans the second connection port and determines whether the second connection port is successfully connected to an external electronic device. When the second connection port fails to be connected to the external electronic device, the control module performs an internal device control mode and a car multimedia main program to control the car display. When the second connection port is successfully connected to the external electronic device, the control module performs an external device control mode to transmit a master control information of the external electronic device to the car display such that the external electronic device controls the car display via the control module.

The invention further provides a car multimedia device control method for automatically switching between an internal device control mode and an external device control mode, performed by the control module of the car multimedia device, including following steps:

determining whether a second connection port is successfully connected to an external electronic device;

when the second connection port fails to be connected to the external electronic device, the control module performs the internal device control mode and a car multimedia main program to control the car display;

when the second connection port is successfully connected to the external electronic device, the control module performs the external device control mode and transmits a master control information of the external electronic device to the car display such that the external electronic device controls the car display via the control module.

The car multimedia device is a multimedia device with a car multimedia main program and other applications authenticated by the car multimedia main program. The car multimedia main program is the interface software mentioned above communicating with the car host via the interface communication protocol. When the second connection port has not been connected to the external electronic device and the car multimedia device is connected to the car host via the first connection port, the car multimedia device has the priority as the master control device and performs the car multimedia main program to project the various built-in applications via the car host to the car display for a driver or a user to operate. When the user connects the external electronic device, such as a smartphone, to the second connection port of the car multimedia device such that the control module determines that the external electronic device is successfully connected to the second connection port, the control module performs the external device control mode, that is, the external electronic device is set as the master control device of the car display, receives the master control information of the external electronic device and directly transmits the master control information to the car display. Meanwhile, the external electronic device is used as the master control device and projects the particular application via the car multimedia device and the car host to the car display. The user directly operates the application of the smartphone by the car display without removing the car multimedia device.

Therefore, the user does not need to pluck the car multimedia device from the connection port of the car computer and then connects the car multimedia device to the smartphone. Since the car multimedia device has the function for automatically switching between the internal device control mode and the external device control mode, the user can directly connect the smartphone to the car multimedia device, and the car multimedia device can be automatically switched to the external device control mode. Then, the applications in the smartphone are directly to be projected in the car display via the car multimedia device for operation.

Therefore, the inconvenience that the user needs to pluck and switch between the two devices is significantly reduced. The car multimedia device of the invention facilitates the user to operate the applications of the operating system for the smartphone in the car display at the condition without affecting the hardware installation and the software function of the original car host. In addition, the users do not need to connect their phones to the car host, so as not to affect the utility of the smartphone. While the user needs to utilize the smartphone to be operated in the car display, the user does not need to disconnect the car multimedia device from the car host instead of directly connecting the smartphone to the car multimedia device, which completes the switching function automatically and provides instinct and rapid user experiences.

DETAILED DESCRIPTION OF THE INVENTION

Figure 1:
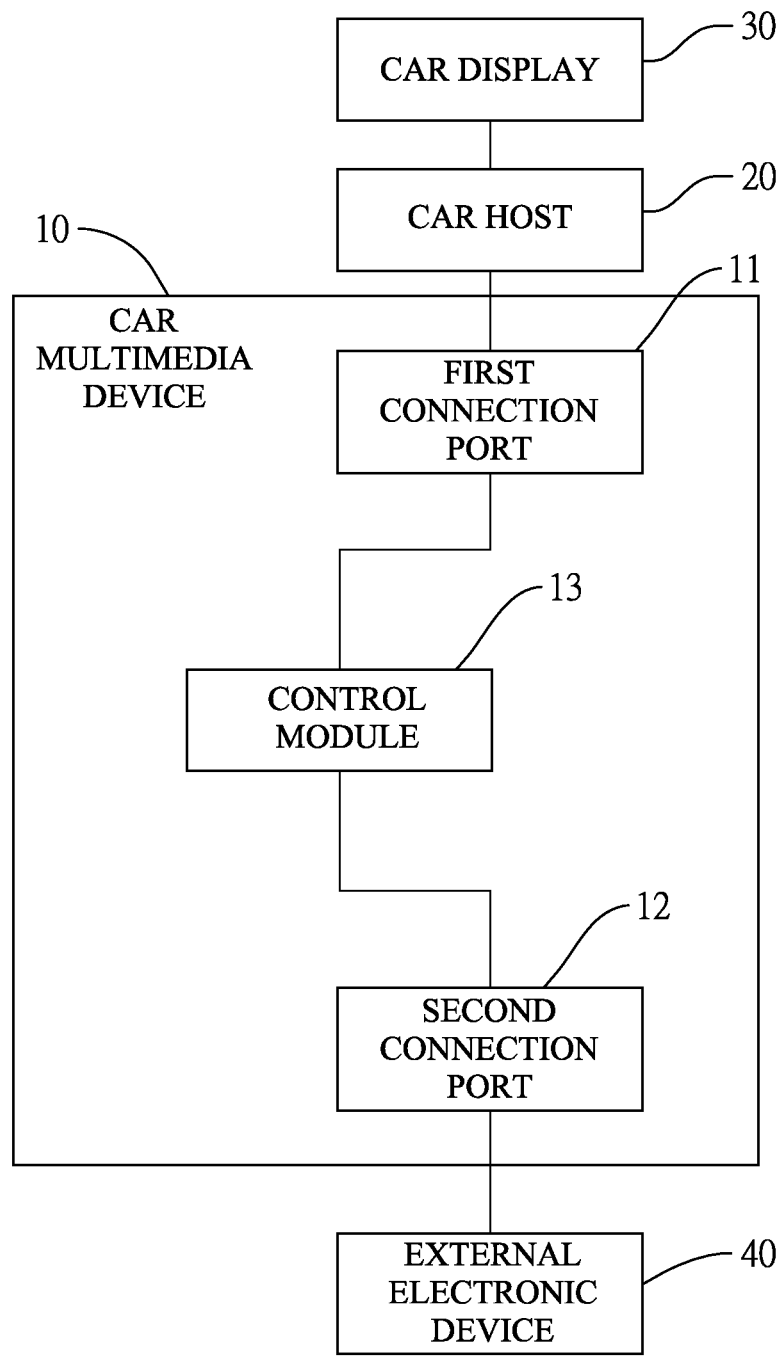
FIG. 1 is a block diagram of the car multimedia device for automatically switching between an internal device control mode and an external device control mode of the present invention.
Figure 2:
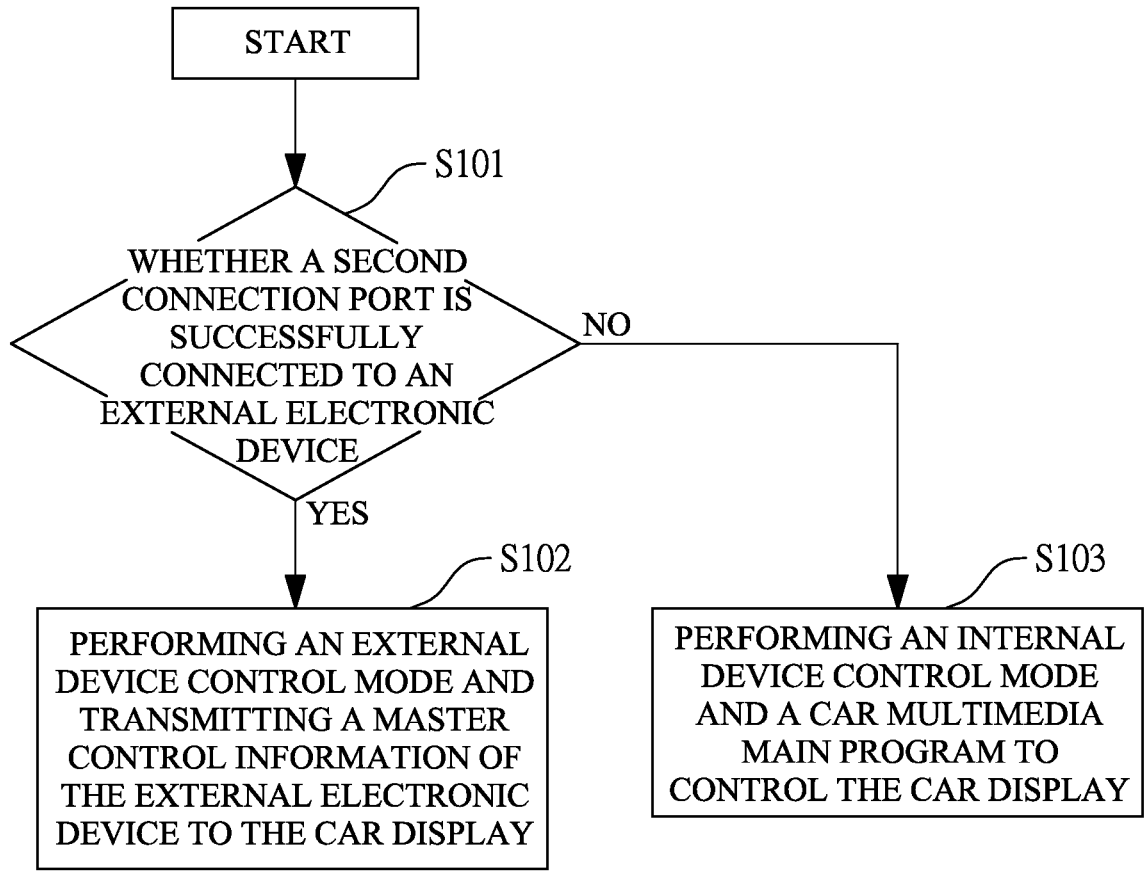
FIG. 2 is a flowchart of the car multimedia device control method for automatically switching between an internal device control mode and an external device control mode of the present invention.

Please refer to FIG. 1. A car multimedia device 10 for automatically switching between an internal device control mode and an external device control mode is used to be connected to a car host 20 and controls a car display 30 via the car host 20. The car multimedia device 10 includes a first connection port 11, a second connection port 12 and a control module 13. The first connection port 11 is used to be connected to the car display 30. The second connection port 12 is used to be connected to an external electronic device 40 by a user. The control module 13 electrically connects to the first connection port 11 and the second connection port 12 and scans the second connection port 12 to determine whether the second connection port 12 is successfully connected to the external electronic device 40.

When the second connection port 12 fails to be connected to the external electronic device 40, the control module 13 performs an internal device control mode and performs a car multimedia main program to control the car display 30. Namely, the car multimedia device 10 can be a car multimedia device 10 of the car display 30 when the second connection port 12 fails to be connected to the external electronic device 40.

When the second connection port 12 is successfully connected to the external electronic device 40, the control module 13 performs the external device control mode and transmits a master control information of the external electronic device 40 to the car display 30 such that the external electronic device 40 controls the car display 30 via the control module 13. When the second connection port 12 is connected to the external electronic device 40, the control module 13 can determine an identification of the external electronic device 40 by the USB OTG protocol standard, and then the external electronic device 40 can be the master control device of the car display 30 by the USB OTG protocol standard. Therefore, the user can use the car multimedia device 10 or the external electronic device 40 as the master control device of the car display 30 to operate the car display 30 without removing the car multimedia device 10.

Moreover, the car multimedia device control method is performed by the control module of the car multimedia device, and includes following steps:

determining whether a second connection port 12 is successfully connected to an external electronic device 40 (S101);

when the second connection port 12 fails to be connected to the external electronic device 40, performing the internal device control mode and a car multimedia main program to control the car display 30 (S102);

when the second connection port 12 is successfully connected to the external electronic device 40, performing the external device control mode, and transmitting a master control information of the external electronic device 40 to the car display 30 such that the external electronic device 40 controls the car display 30 via the control module (S103).

When the second connection port 12 is successfully connected to the external electronic device 40, the control module 13 performs the external device control mode and transmits the master control information of the external electronic device to the car display 30 such that the external electronic device controls the car display via the control module 13.

In a first preferable embodiment of the invention, when the car multimedia device 10 is at a booting stage, that is, the booting procedure has not been completed, the control module 13 stores a predetermined current threshold, and performs a connection port current detection procedure for the second connection port 12 to scan the second connection port 12 and to determine whether a current passing through the second connection port 12 is greater than the current threshold. When the current passing through the second connection port 12 is greater than the current threshold, the control module 13 determines that the second connection port 12 is successfully connected to the external electronic device 40. Therefore, the control module 13 performs the external device control mode. When the current passing through the second connection port 12 is less than the current threshold, the control module 13 determines that the second connection port 12 fails to be connected to the external electronic device 40. Namely, the control module 13 can determine whether the external electronic device 40 is successfully connected to the second connection port 12 by determining whether the current passing through the second connection port 12 is greater than the current threshold.

Figure 3:
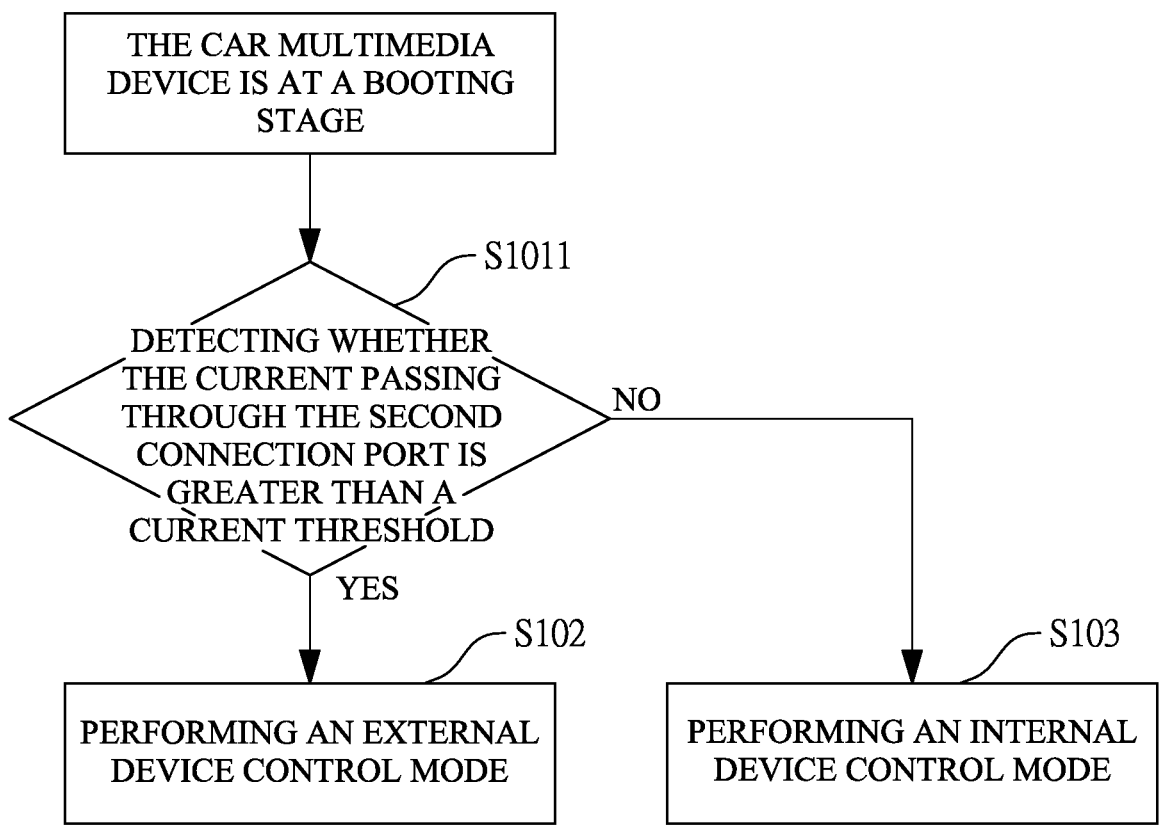
FIG. 3 is a first preferable embodiment of the car multimedia device control method for automatically switching between an internal device control mode and an external device control mode of the present invention.

Please refer to FIG. 3. In the first preferable embodiment, when the car multimedia device 10 is at a booting stage, the step of "scanning the second connection port 12 and determining whether a second connection port 12 is successfully connected to an external electronic device 40" is performed by the following sub-steps:

performing a current detection procedure of a connection port to detect the current passing through the second connection port 12 (S1011);

when the current passing through the second connection port 12 is greater than a current threshold, determining that the second connection port 12 is successfully connected to the external electronic device 40 and performing the external device control mode (S102);

when the current passing through the second connection port 12 is less than the current threshold, determining that the second connection port 12 fails to be connected to the external electronic device 40 and performing the internal device control mode (S103).

Furthermore, in a second preferable embodiment of the invention, when the car multimedia device 10 is at a power-on stage at which the booting stage has been completed and the user can initially operate the car multimedia device 10, the control module 13 scans the second connection port 12 according to the connection port protocol, and determines whether the second connection port 12 is connected to the external electronic device 40.

When the control module 13 determines that the second connection port 12 has been connected to the external electronic device 40 according to the connection port protocol, the control module 13 further performs an identification recognition procedure to determine the identification of the external electronic device 40. When the identification of the external electronic device 40 is a predetermined master control device, the control module 13 determines that the second connection port 12 is successfully connected to the external electronic device 40 and then performs the external device control mode.

When the control module 13 determines that the identification of the external electronic device 40 is not a predetermined master control device according to the identification recognition procedure, the control module 13 determines that the second connection port 12 fails to be connected to the external electronic device 40 and performs the internal device control mode.

Figure 4:
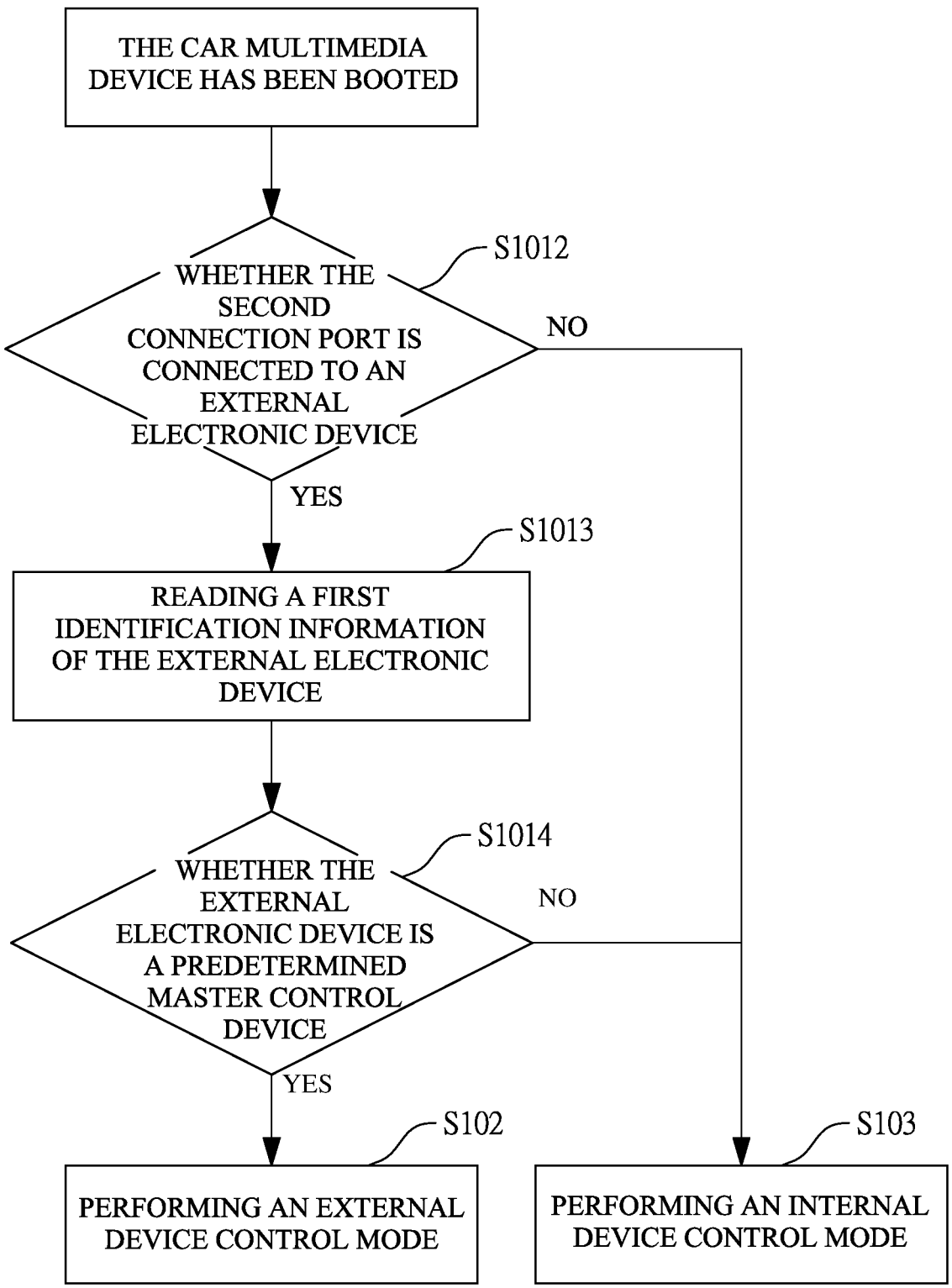
FIG. 4 is a second preferable embodiment of the car multimedia device control method for automatically switching between an internal device control mode and an external device control mode of the present invention.

Please refer to FIG. 4, in the preferable embodiment, when the car multimedia device 10 has been booted, the step, "determining whether a second connection port 12 is successfully connected to an external electronic device 40", is performed by scanning the second connection port 12 according to the connection port protocol to determine whether the second connection port 12 is connected to the external electronic device 40 (S1012);

when the second connection port 12 is connected to the external electronic device 40, reading a first identification information (S1013) of the external electronic device 40 according to the connection port protocol, comparing the first identification information to a predetermined master control device list, and determining whether the external electronic device 40 is a predetermined master control device (S1014);

when the external electronic device 40 is a predetermined master control device, determining that the second connection port 12 is successfully connected to the external electronic device 40 and performing the external device control mode (S102);

when the external electronic device 40 is not a predetermined master control device, determining that the second connection port 12 fails to be connected to the external electronic device 40 and performing the internal device control mode (S103).

Wherein, for the better, the connection port protocol is the USB OTG (Universal Serial bus On-The Go) standard protocol and the second connection port 12 corresponds to the connection port of the USB OTG standard protocol.

In the first preferable embodiment of the invention, when the car multimedia device 10 is at a booting stage, the car multimedia main program and other applications of the car multimedia device 10 have not completed the reading and loading procedure to provide the function of the applications in the car display 30 and the software detection procedure of the connection port also cannot be performed or is performed in low efficiency. Therefore, the control module 13 performs the current detection procedure of the connection port of the hardware to determine whether the second connection port 12 has been successfully connected to the external electronic device 40. When the current passing through the second connection port 12 is greater than the current threshold, the control module 13 determines that the second connection port 12 has been successfully connected to the external electronic device 40. Therefore, the control module 13 performs the external device control mode and transmits the master control information of the external electronic device 40 to the car display 30 such that the external electronic device 40 controls the car display 30 via the control module 13.

Consequently, when the car multimedia device 10 is still at a booting stage and cannot provide functions in the car display 30 to be operated, the user connects the external electronic device 40, such as a smartphone, to the second connection port 12 of the car multimedia device 10 and also can enable the interface software of the smartphone to be rapidly authenticated by the car multimedia device 10 as the master control device of the car display 30, transmit the master control information of the smartphone to the car display 30, and show the applications of the smartphone for being operated by the user. Moreover, if the user connects the external electronic device 40 which cannot serve as the master control device to the second connection port 12, such as a mouse device, since the required current which the external electronic device 40 is connected to the connection port is less than the current threshold, the control module 13 determines that the second connection port 12 fails to be connected to the external electronic device 40. Therefore, the control module 13 continuously performs the internal device control mode.

In the second preferable embodiment, when the car multimedia device 10 has been booted, the control module 13 scans the second connection port 12 according to the connection port protocol to determine whether the second connection port 12 is connected to the external electronic device 40 by the software. When the second connection port 12 has been connected to the external electronic device 40, the control module 13 determines that the second connection port 12 is connected to the external electronic device 40, the control module 13 reads a first identification information of the external electronic device 40 according to the connection port protocol, and the control module 13 compares the first identification information to a predetermined master control device list to determine whether the external electronic device 40 is a predetermined master control device. When the external electronic device 40 is the predetermined master control device, the control module 13 determines that the second connection port 12 is successfully connected to the external electronic device 40, and performs the external device control mode. If the external electronic device 40 is not the predetermined master control device, the control module 13 determines that the second connection port 12 fails to be connected to the external electronic device 40 and still performs the internal device control mode.

That is, at this time, the control module 13 has completed the booting procedure to further determine whether the identification of the external electronic device 40 is a predetermined master control device by the identification recognition procedure of the connection port protocol. If yes, the control module 13 performs the external device control mode, and transmits the master control information of the external electronic device 40 to the car display 30. If not, the control module 13 continuously performs the internal device control mode and controls the car display 30.

The identification information of the predetermined master control device is predetermined, and is stored in the control module 13. Therefore, the control module 13 can determine whether the external electronic device 40 connected to the second connection port 12 is a predetermined master control device after the control module 13 reads the first identification information according to the connection port protocol.

For instance, when the external electronic device 40 connected to the second connection port 12 is a wireless mouse signal receiver, the control module 13 reads the first identification information of the wireless mouse signal receiver, compares the predetermined master control device list, and determines that the first identification information of the wireless mouse signal receiver does not exist in the list. Therefore, the control module 13 determines that the external electronic device 40 connected to the second connection port 12 is not the predetermined master control device, and the control module 13 continuously performs the internal device control mode. In this way, the control information generated by the wireless mouse signal receiver would not be transmitted to the car host 20 and the car display 30 via the car multimedia device 10 to cause failure to recognize the control information. Therefore, the internal device control mode is continuously performed for the user to operate in the car display 30, and the functions of the car host 20 and the car display 30 are not affected by plugging in the unrecognized external electronic device to the second connection port 12.

In a third preferable embodiment of the invention, the control module 13 stores a user predetermined information, which is an automatically switching setting information or a manually switching setting information. When the second connection port 12 is successfully connected to the external electronic device 40, the control module 13 further reads the user predetermined information and determines whether the user information is the automatically switching setting information. If yes, the control module 13 directly performs the external device control mode. If not, the control module 13 determines that the user information is the manually switching setting information, controls the car display 30 to show a notification message, and determines whether a switching confirmation signal is received by the control module 13. If the switching confirmation signal is received by the control module 13, the control module 13 performs the external device control mode. If the switching confirmation signal is not received by the control module 13, the control module 13 performs the internal device control mode.

Figure 5:
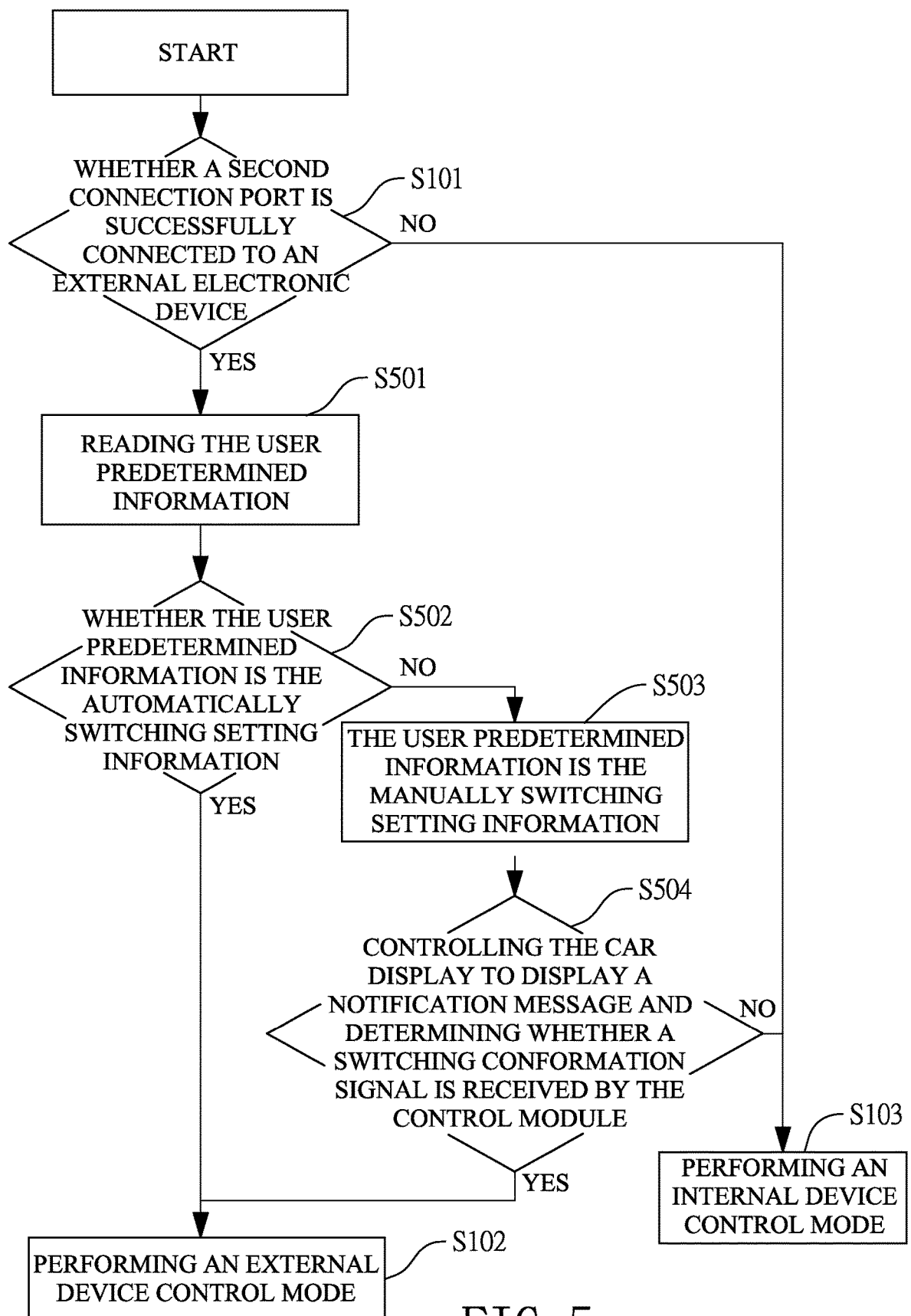
FIG. 5 is a third preferable embodiment of the car multimedia device control method for automatically switching between an internal device control mode and an external device control mode of the present invention.

Please refer to FIG. 5, in the preferable embodiment, when the second connection port 12 is successfully connected to the external electronic device, the car multimedia device control method further performs following steps:

reading the user predetermined information (S501);

determining whether the user predetermined information is the automatically switching setting information (S502);

if yes, directly performing the external device control mode (S102);

if not, determining the user predetermined information is the manually switching setting information (S503);

when the user information is the manually switching setting information, controlling the car display 30 to display a notification message, and determining whether a switching confirmation signal is received by the control module (S504);

if the switching confirmation signal is received by the control module, performing the external device control mode (S102);

if the switching confirmation signal is not received by the control module, performing the internal device control mode (S103).

That is, when the control module 13 scans the second connection port 12 to determine that the external electronic device 40 has been connected to the second connection port 12, the control module 13 firstly reads the user predetermined information to determine whether the control module 13 directly performs the function with automatically switching the master control device or not. If the user predetermined information is the automatically switching setting information, the control module 13 automatically switches for determining the external device control mode. If the user predetermined information is the manually switching setting information, the control module 13 stills performs the original internal device control mode, and controls the car display 30 to display a notification message for the user to conform whether the user switches the external electronic device 40 as the master control device. After the user inputs a switching message via the input unit (not shown in figures) of the car host 20, the control module 13 performs the external device control mode. The input unit can be a touch input unit with the car display 30 or a bottom input module in a control panel of a vehicle.

In a fourth preferable embodiment of the invention, the user predetermined information stored by the control module 13 is an automatically switching setting information, a manually switching setting information, or a charge mode setting information. When the second connection port 12 is successfully connected to the external electronic device, the control module 13 further reads the user predetermined information, and determines whether the user information is the automatically switching setting information. If yes, the control module 13 directly performs the external device control mode. If not, the control module 13 further determines whether the user information is the manually switching setting information. If the user information is the manually switching setting information, the control module 13 controls the car display 30 to display a notification message, and determines whether a switching confirmation signal is received by the control module 13. If the switching confirmation signal is received by the control module 13, the control module 13 performs the external device control mode. If the switching confirmation signal is not received by the control module, the control module 13 performs the internal device control mode. If the user information is not the manually switching setting information or the automatically switching setting information, the control module 13 determines that the user predetermined information is the charge mode setting information, the control module 13 performs the internal device control mode, and the control module 13 provides a charge current to the external electronic device via the second connection port 12.

Figure 6A:
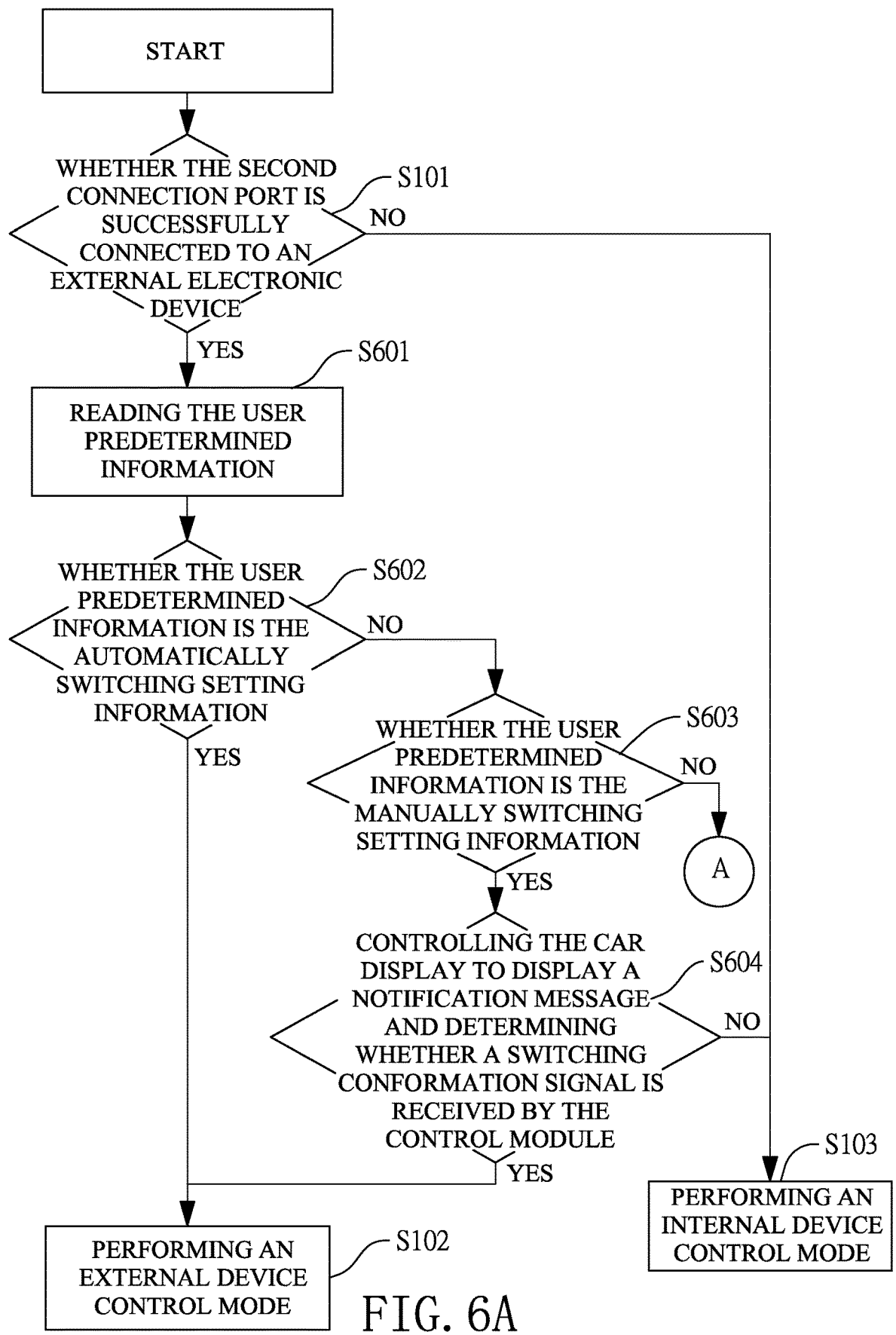
FIGS. 6A to 6B show a fourth preferable embodiment of the car multimedia device control method for automatically switching between an internal device control mode and an external device control mode of the present invention.
Figure 6B:
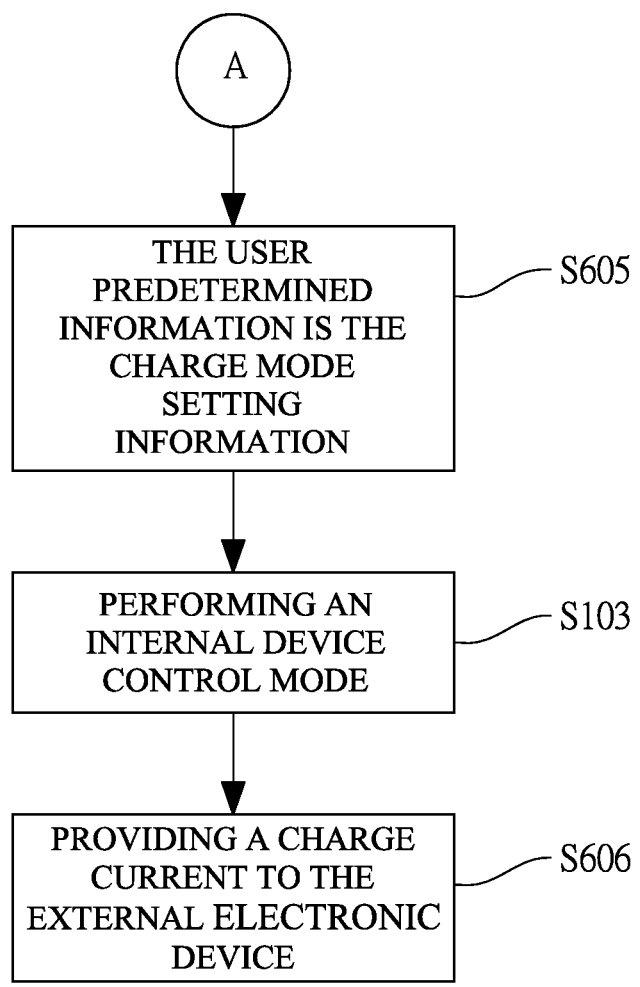
Figure 7:
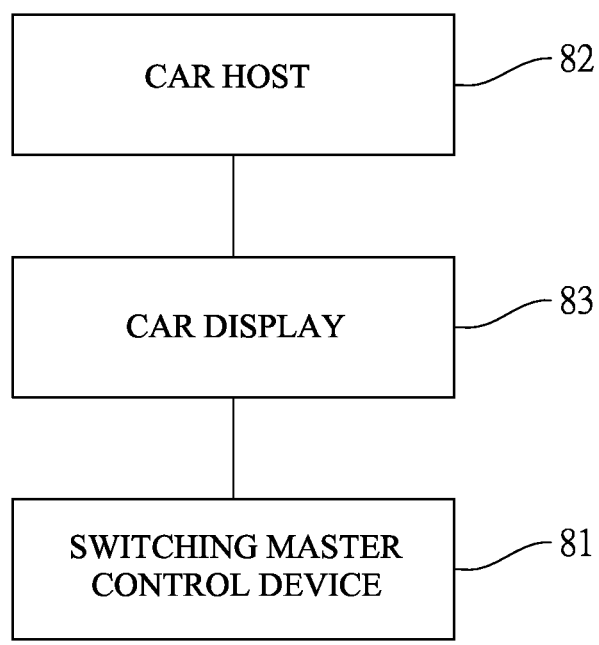
FIG. 7 is a block diagram of the car multimedia system of the prior art.
Figure 8:
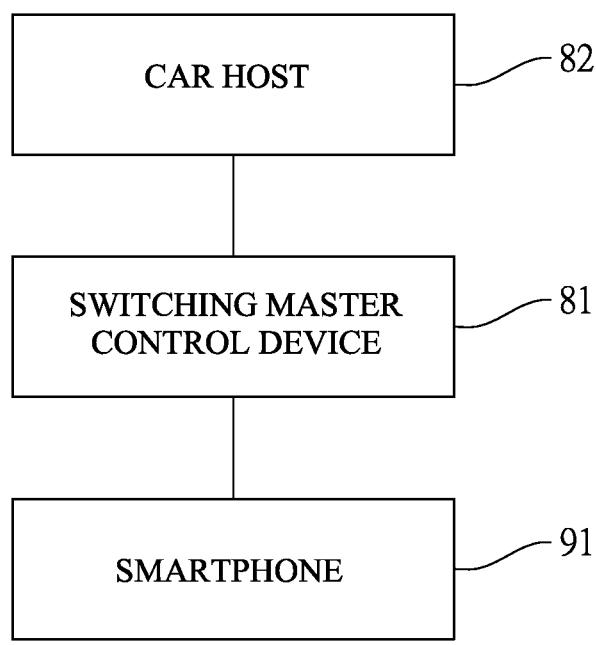
FIG. 8 is a block diagram of the multimedia system of the prior art.
Figure 9A:
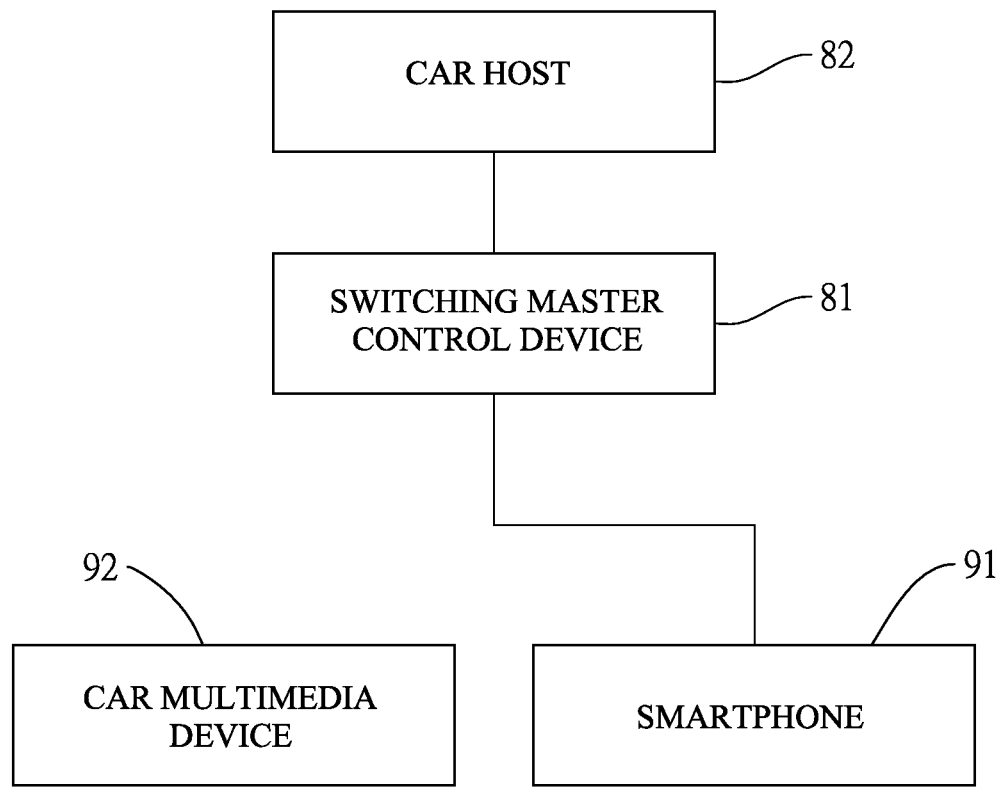
FIGS. 9A to 9B show another block diagram for a usage state of the multimedia system of the prior art.
Figure 9B:
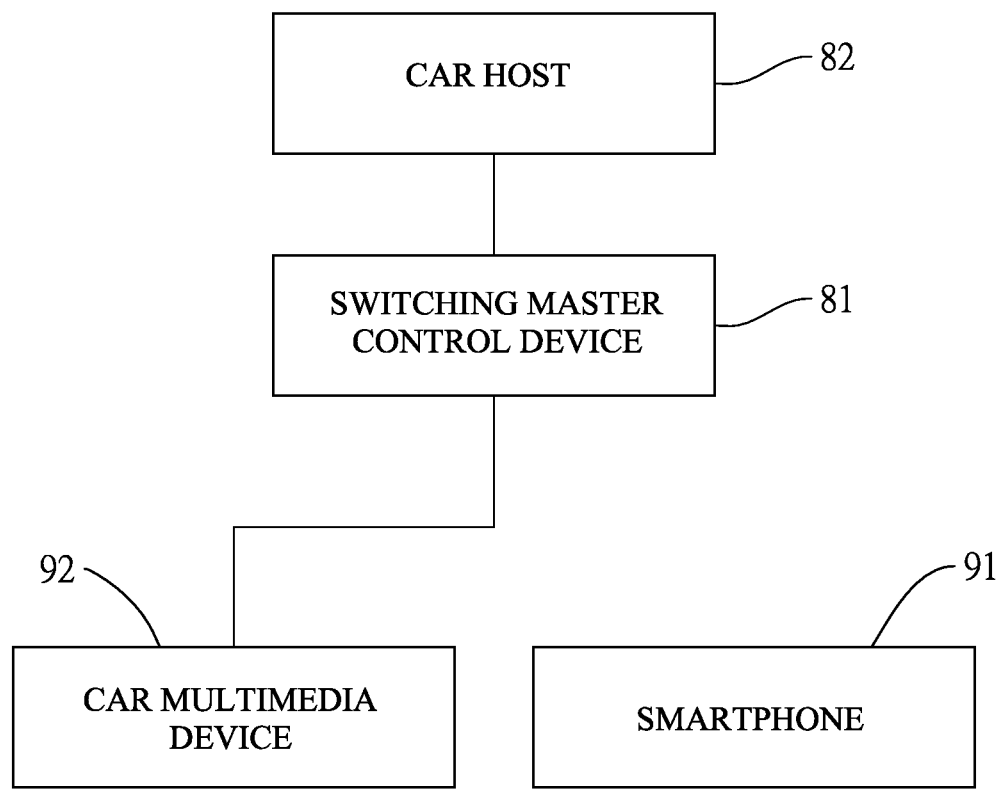

Please refer to FIG. 6A and FIG. 6B. When the second connection port 12 is successfully connected to the external electronic device, the car multimedia device control method further performs following steps:

reading the user predetermined information (S601);

determining whether the user predetermined information is the automatically switching setting information (S602);

if yes, directly performing the external device control mode (S102);

if not, determining whether the user predetermined information is the manually switching setting information (S603);

when the user predetermined information is the manually switching setting information, controlling the car display 30 to display a notification message, and determining whether a switching confirmation signal is received (S604) by the control module 13;

if the switching confirmation signal is received by the control module 13, performing the external device control mode (S102);

if the switching confirmation signal is not received by the control module, performing the internal device control mode (S103);

when the user predetermined information is not the manually switching setting information, determining that the user predetermined information is the charge mode setting information (S605), performing the internal device control mode (S103), and providing a charge current to the external electronic device (S606) via the second connection port 12.

The difference between the third preferable embodiment and the fourth preferable embodiment is that the user predetermined information stored by the control module 13 of the car multimedia device 10 includes the automatically switching setting information, the manually switching setting information, and the charge mode setting information. If the user predetermined information is the charge mode setting information, and when the second connection port is successfully connected to the external electronic device, the control module 13 performs the internal device control mode to provide the applications of the car multimedia device 10 to the car display 30 for being operated by the user, and to provide the charge current to the second connection port 12 for the external electronic device 40 to charge. In this mode, although the master control information of the external electronic device 40 is not to be transmitted to the car display 30, the second connection port 12 still provides the function for charging.

Preferably, the user predetermined information is predetermined according to the user. For example, the user predetermined information is predetermined last time that the user uses the internal device control mode of the car multimedia device 10 via operating an input unit of the car host 20. Preferably, the control module 13 provides the charge current to the external electronic device 40 according to a charge standard protocol.

In summary, the car multimedia device 10 of the invention determines whether the car multimedia device 10 is connected to the external electronic device 40 by the second connection port 12. If yes, the car multimedia device 10 switches the external electronic device 40 as the master control device of the car display 30. Therefore, the user can instinctively select the car multimedia device 10 or the external electronic device 40 to be the master control device of the car display 30 for manipulating the applications of the car multimedia device 10 or the external electronic device 40 on the car display 30 of the car multimedia device 10 by connecting the external electronic device 40 to the second connection port 12 or not.

Furthermore, at a booting stage, the car multimedia device 10 determines whether the car multimedia device 10 is successfully connected to the external electronic device 40 by detecting the current of the hardware (the connection port). Even the software of the control module 13 has not been loaded, the car multimedia device 10 can rapidly switch to the external device control mode to reduce the time the user waits for booting. When the car multimedia device 10 has completed the booting procedure, the car multimedia device 10 accurately determines the identification of the external electronic device 40 according to the connection port protocol of the software to decide whether the control module 13 performs the external device control mode. In this way, the car multimedia device 10 can avoid the car display 30 receiving the information which cannot be recognized and running errors. Accordingly, the invention provides perfect experience for the user.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A car multimedia device with a function for automatically switching between an internal device control mode and an external device control mode, connecting to a car host to control a car display via the car host, and comprising:
   a first connection port, being connected to the car host;
   a second connection port;
   a control module, electrically connecting to the first connection port and the second connection port;
   wherein the control module scans the second connection port to determine whether the second connection port is connected to an external electronic device;
   wherein when the second connection port fails to be connected to the external electronic device, the control module performs the internal device control mode and a car multimedia main program to control the car display;
   wherein when the second connection port is connected to the external electronic device, the control module performs the external device control mode to transmit a master control information of the external electronic device to the car display, such that the external electronic device controls the car display via the control module;
   wherein when the car multimedia device is at a booting stage, the control module performs a current detection procedure of a connection port to scan the second connection port and determines whether a current passing through the second connection port is greater than a current threshold;
   wherein when the current passing through the second connection port is greater than the current threshold, the control module determines that the second connection port is successfully connected to the external electronic device;
   wherein when the current passing through the second connection port is less than the current threshold, the control module determines that the second connection port fails to be connected to the external electronic device.

2. The car multimedia device with the function for automatically switching between the internal device control mode and the external device control mode as claimed in claim 1, wherein when the car multimedia device has been booted, the control module scans the second connection port according to a connection port protocol and determines whether the second connection port is connected to the external electronic device;
   wherein when the control module determines that the second connection port is connected to the external electronic device, the control module reads a first identification information of the external electronic device according to the connection port protocol, compares the first identification information to a predetermined master control device list and determines whether the external electronic device is a predetermined master control device;
   wherein when the external electronic device is the predetermined master control device, the control module determines that the second connection port is successfully connected to the external electronic device;
   wherein when the external electronic device is not the predetermined master control device, the control module determines that the second connection port fails to be connected to the external electronic device.

3. The car multimedia device with the function for automatically switching between the internal device control mode and the external device control mode as claimed in claim 2, wherein the connection port protocol is a USB OTG (Universal Serial bus On-The-Go) standard protocol and the second connection port corresponds to the connection port of the USB OTG standard protocol.

4. The car multimedia device with the function for automatically switching between the internal device control mode and the external device control mode as claimed in claim 1, wherein the control module stores a user predetermined information, which is an automatically switching setting information or a manually switching setting information;
   wherein when the second connection port is successfully connected to the external electronic device, the control module further reads the user predetermined information and determines whether the user predetermined information is the automatically switching setting information;
   wherein when the user predetermined information is the automatically switching setting information, the control module directly performs the external device control mode;
   wherein when the user predetermined information is not the automatically switching setting information, the control module determines that the user predetermined information is the manually switching setting information, controls the car display to display a notification message and determines whether a switching confirmation signal is received by the control module;
   wherein when the switching confirmation signal is received by the control module, the control module performs the external device control mode, and when the switching confirmation signal is not received by the control module, the control module performs the internal device control mode.

5. The car multimedia device with the function for automatically switching between the internal device control mode and the external device control mode as claimed in claim 1, wherein the control module stores a user predetermined information, which is an automatically switching setting information, a manually switching setting information or a charge mode setting information;
  wherein when the second connection port is successfully connected to the external electronic device, the control module further reads the user predetermined information and determines whether the user information is the automatically switching setting information, if yes, the control module directly performs the external device control mode, if not, the control module determines whether the user information is the manually switching setting information;
  wherein when the user information is the manually switching setting information, the control module controls the car display to display a notification message and determines whether a switching confirmation signal is received by the control module, when the switching confirmation signal is received by the control module, the control module performs the external device control mode; when the switching confirmation signal is not received by the control module, the control module performs the internal device control mode;
  wherein when the user information is not the manually switching setting information, the control module determines that the user predetermined information is the charge mode setting information, performs the internal device control mode and provides a charge current to the external electronic device via the second connection port.

6. A car multimedia device control method with a function for automatically switching between an internal device control mode and an external device control mode, performed by a control module of a car multimedia device, wherein the car multimedia device has a first connection port to be connected to a car host, the control module controls a car display via the car host, and the car multimedia device control method comprises following steps:
  determining whether a second connection port is successfully connected to an external electronic device;
  when the second connection port fails to be connected to the external electronic device, performing an internal device control mode, and performing a car multimedia main program to control the car display;
  when the second connection port is successfully connected to the external electronic device, performing an external device control mode, and transmitting a master control information of the external electronic device to the car display such that the external electronic device controls the car display via the control module;
  when the car multimedia device is at a boot stage, performing a current detection procedure of a connection port to scan the second connection port and to determine whether a current passing through the second connection port is greater than a current threshold;
  when the current passing through the second connection port is greater than the current threshold, determining that the second connection port is successfully connected to the external electronic device and performing the external device control mode;
  wherein when the current passing through the second connection port is less than the current threshold, determining that the second connection port fails to be connected to the external electronic device and performing the internal device control mode.

7. The car multimedia device control method as claimed in claim 6, further comprising following steps:
  when the car multimedia device is at a boot accomplished stage, scanning the second connection port according to the connection port protocol to determine whether the second connection port is connected to the external electronic device;
  when the second connection port is connected to the external electronic device, reading a first identification information of the external electronic device according to the connection port protocol, comparing the first identification information to a predetermined master control device list, and determining whether the external electronic device is a predetermined master control device;
  when the external electronic device is the predetermined master control device, determining that the second connection port is successfully connected to the external electronic device;
  when the external electronic device is not the predetermined master control device, determining that the second connection port fails to be connected to the external electronic device.

8. The car multimedia device control method as claimed in claim 6, wherein the control module stores a user predetermined information, which is an automatically switching setting information or a manually switching setting information, and the car multimedia device control method further comprises following steps:
  when the second connection port is successfully connected to the external electronic device, further reading the user predetermined information, and determining whether the user information is the automatically switching setting information;
  wherein when the user information is the automatically switching setting information, performing the external device control mode;
  wherein when the user information is not the automatically switching setting information, determining that the user information is the manually switching setting information;
  when the user information is the manually switching setting information, controlling the car display to display a notification message, and determining whether a switching confirmation signal is received by the control module;
  wherein when the switching confirmation signal is received by the control module, performing the external device control mode;
  wherein when the switching confirmation signal is not received by the control module, performing the internal device control mode.

9. The car multimedia device control method as claimed in claim 6, wherein the control module stores a user predetermined information, which is an automatically switching setting information or a manually switching setting information, and the car multimedia device control method further comprises following steps:
  when the second connection port is successfully connected to the external electronic device, further reading the user predetermined information, and determining whether the user information is the automatically switching setting information;

wherein when the user information is the automatically switching setting information, performing the external device control mode;

wherein when the user information is not the automatically switching setting information, determining that the user information is the manually switching setting information;

when the user information is the manually switching setting information, controlling the car display to display a notification message, and determining whether a switching confirmation signal is received by the control module;

wherein when the switching confirmation signal is received by the control module, performing the external device control mode;

wherein when the switching confirmation signal is not received by the control module, performing the internal device control mode.

10. The car multimedia device control method as claimed in claim 6, wherein the control module stores a user predetermined information, which is an automatically switching setting information, a manually switching setting information, or a charge mode setting information, and the car multimedia device control method further comprises following steps:

when the second connection port is successfully connected to the external electronic device, reading the user predetermined information, and determining whether the user information is the automatically switching setting information;

wherein when the user information is the automatically switching setting information, the control module directly performs the external device control mode;

wherein when the user information is not the automatically switching setting information, determining whether the user information is the manually switching setting information;

when the user information is the manually switching setting information, controlling the car display to display a notification message, and determining whether a switching confirmation signal is received by the control module;

wherein when the switching confirmation signal is received by the control module, performing the external device control mode;

wherein when the switching confirmation signal is not received by the control module, performing the internal device control mode;

when the user information is not the manually switching setting information, determining that the user predetermined information is the charge mode setting information, performing the internal device control mode, and providing a charge current to the external electronic device via the second connection port.

11. The car multimedia device control method as claimed in claim 6, wherein the control module stores a user predetermined information, which is an automatically switching setting information, a manually switching setting information, or a charge mode setting information, and the car multimedia device control method further comprises following steps:

when the second connection port is successfully connected to the external electronic device, reading the user predetermined information, and determining whether the user information is the automatically switching setting information;

wherein when the user information is the automatically switching setting information, the control module directly performs the external device control mode;

wherein when the user information is not the automatically switching setting information, determining whether the user information is the manually switching setting information;

when the user information is the manually switching setting information, controlling the car display to display a notification message, and determining whether a switching confirmation signal is received by the control module;

wherein when the switching confirmation signal is received by the control module, performing the external device control mode;

wherein when the switching confirmation signal is not received by the control module, performing the internal device control mode;

when the user information is not the manually switching setting information, determining that the user predetermined information is the charge mode setting information, performing the internal device control mode, and providing a charge current to the external electronic device via the second connection port.

12. A car multimedia device with a function for automatically switching between an internal device control mode and an external device control mode, connecting to a car host to control a car display via the car host, and comprising:

a first connection port, being connected to the car host;

a second connection port;

a control module, electrically connecting to the first connection port and the second connection port;

wherein the control module scans the second connection port to determine whether the second connection port is connected to an external electronic device;

wherein when the second connection port fails to be connected to the external electronic device, the control module performs the internal device control mode and a car multimedia main program to control the car display;

wherein when the second connection port is connected to the external electronic device, the control module performs the external device control mode to transmit a master control information of the external electronic device to the car display, such that the external electronic device controls the car display via the control module;

wherein when the car multimedia device has been booted, the control module scans the second connection port according to a connection port protocol and determines whether the second connection port is connected to the external electronic device;

wherein when the control module determines that the second connection port is connected to the external electronic device, the control module reads a first identification information of the external electronic device according to the connection port protocol, compares the first identification information to a predetermined master control device list and determines whether the external electronic device is a predetermined master control device;

wherein when the external electronic device is the predetermined master control device, the control module determines that the second connection port is successfully connected to the external electronic device;

wherein when the external electronic device is not the predetermined master control device, the control module determines that the second connection port fails to be connected to the external electronic device.

13. The car multimedia device with the function for automatically switching between the internal device control mode and the external device control mode as claimed in claim 12, wherein the connection port protocol is a USB OTG (Universal Serial bus On-The-Go) standard protocol and the second connection port corresponds to the connection port of the USB OTG standard protocol.

14. The car multimedia device with the function for automatically switching between the internal device control mode and the external device control mode as claimed in claim 12, wherein the control module stores a user predetermined information, which is an automatically switching setting information or a manually switching setting information;

wherein when the second connection port is successfully connected to the external electronic device, the control module further reads the user predetermined information and determines whether the user predetermined information is the automatically switching setting information;

wherein when the user predetermined information is the automatically switching setting information, the control module directly performs the external device control mode;

wherein when the user predetermined information is not the automatically switching setting information, the control module determines that the user predetermined information is the manually switching setting information, controls the car display to display a notification message and determines whether a switching confirmation signal is received by the control module;

wherein when the switching confirmation signal is received by the control module, the control module performs the external device control mode, and when the switching confirmation signal is not received by the control module, the control module performs the internal device control mode.

15. The car multimedia device with the function for automatically switching between the internal device control mode and the external device control mode as claimed in claim 12, wherein the control module stores a user predetermined information, which is an automatically switching setting information, a manually switching setting information or a charge mode setting information;

wherein when the second connection port is successfully connected to the external electronic device, the control module further reads the user predetermined information and determines whether the user information is the automatically switching setting information, if yes, the control module directly performs the external device control mode, if not, the control module determines whether the user information is the manually switching setting information;

wherein when the user information is the manually switching setting information, the control module controls the car display to display a notification message and determines whether a switching confirmation signal is received by the control module, when the switching confirmation signal is received by the control module, the control module performs the external device control mode; when the switching confirmation signal is not received by the control module, the control module performs the internal device control mode;

wherein when the user information is not the manually switching setting information, the control module determines that the user predetermined information is the charge mode setting information, performs the internal device control mode and provides a charge current to the external electronic device via the second connection port.

16. A car multimedia device control method with a function for automatically switching between an internal device control mode and an external device control mode, performed by a control module of a car multimedia device, wherein the car multimedia device has a first connection port to be connected to a car host, the control module controls a car display via the car host, and the car multimedia device control method comprises following steps:

determining whether a second connection port is successfully connected to an external electronic device;

when the second connection port fails to be connected to the external electronic device, performing an internal device control mode, and performing a car multimedia main program to control the car display;

when the second connection port is successfully connected to the external electronic device, performing an external device control mode, and transmitting a master control information of the external electronic device to the car display such that the external electronic device controls the car display via the control module;

when the car multimedia device is at a boot accomplished stage, scanning the second connection port according to the connection port protocol to determine whether the second connection port is connected to the external electronic device;

when the second connection port is connected to the external electronic device, reading a first identification information of the external electronic device according to the connection port protocol, comparing the first identification information to a predetermined master control device list, and determining whether the external electronic device is a predetermined master control device;

when the external electronic device is the predetermined master control device, determining that the second connection port is successfully connected to the external electronic device;

when the external electronic device is not the predetermined master control device, determining that the second connection port fails to be connected to the external electronic device.

17. The car multimedia device control method as claimed in claim 16, wherein the control module stores a user predetermined information, which is an automatically switching setting information or a manually switching setting information, and the car multimedia device control method further comprises following steps:

when the second connection port is successfully connected to the external electronic device, further reading the user predetermined information, and determining whether the user information is the automatically switching setting information;

wherein when the user information is the automatically switching setting information, performing the external device control mode;

wherein when the user information is not the automatically switching setting information, determining that the user information is the manually switching setting information;

when the user information is the manually switching setting information, controlling the car display to display a notification message, and determining whether a switching confirmation signal is received by the control module;

wherein when the switching confirmation signal is received by the control module, performing the external device control mode;

wherein when the switching confirmation signal is not received by the control module, performing the internal device control mode.

18. The car multimedia device control method as claimed in claim 16, wherein the control module stores a user predetermined information, which is an automatically switching setting information, a manually switching setting information, or a charge mode setting information, and the car multimedia device control method further comprises following steps:

when the second connection port is successfully connected to the external electronic device, reading the user predetermined information, and determining whether the user information is the automatically switching setting information;

wherein when the user information is the automatically switching setting information, the control module directly performs the external device control mode;

wherein when the user information is not the automatically switching setting information, determining whether the user information is the manually switching setting information;

when the user information is the manually switching setting information, controlling the car display to display a notification message, and determining whether a switching confirmation signal is received by the control module;

wherein when the switching confirmation signal is received by the control module, performing the external device control mode;

wherein when the switching confirmation signal is not received by the control module, performing the internal device control mode;

when the user information is not the manually switching setting information, determining that the user predetermined information is the charge mode setting information, performing the internal device control mode, and providing a charge current to the external electronic device via the second connection port.

* * * * *